(12) United States Patent
Fan

(10) Patent No.: US 10,852,603 B2
(45) Date of Patent: Dec. 1, 2020

(54) LCOS PIXEL FILM LAYER DESIGN FOR REFLECTION RATE IMPROVEMENT

(71) Applicant: OmniVision Technologies, Inc., Santa Clara, CA (US)

(72) Inventor: Chun-Sheng (CS) Fan, Zhudong Township (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 16/267,300

(22) Filed: Feb. 4, 2019

(65) Prior Publication Data

US 2020/0249536 A1    Aug. 6, 2020

(51) Int. Cl.
*G02F 1/1335*    (2006.01)
*G02F 1/1362*    (2006.01)

(52) U.S. Cl.
CPC .. *G02F 1/136277* (2013.01); *G02F 1/133555* (2013.01)

(58) Field of Classification Search
None
See application file for complete search history.

(56) References Cited

U.S. PATENT DOCUMENTS

| | | | |
|---|---|---|---|
| 2005/0270454 A1* | 12/2005 | Ahn | G02F 1/133555 349/114 |
| 2008/0106677 A1 | 5/2008 | Kuan et al. | |
| 2016/0246115 A1 | 8/2016 | Fan | |
| 2020/0019029 A1* | 1/2020 | Park | G09G 3/3607 |

* cited by examiner

*Primary Examiner* — Richard H Kim
(74) *Attorney, Agent, or Firm* — Larry E. Henneman, Jr.; Henneman & Associates, PLC

(57) ABSTRACT

A novel liquid crystal on silicon (LCoS) device includes an array of pixel electrodes having a highly reflective material formed thereon. In a particular embodiment, the pixel electrodes are aluminum and have silver pixel mirrors electroplated thereon. In a more particular embodiment, the LCoS device includes auxiliary circuitry facilitating the electroplating of the pixel mirrors.

29 Claims, 14 Drawing Sheets

LCOS PIXEL FILM LAYER DESIGN FOR REFLECTION RATE IMPROVEMENT

BACKGROUND OF THE INVENTION

Field of the Invention

This invention relates generally to liquid crystal displays, and more particularly to liquid crystal on silicon (LCOS) displays.

Description of the Background Art

Currently there is a demand for display devices in various commercial and consumer applications. For example, LCoS image display devices are being incorporated into many different mobile and automotive devices. As another example, LCoS image display devices are used in high quality projection systems.

FIG. 1 shows a cross-sectional, side view of a prior art LCoS image display device 100, which includes a semiconductor substrate 102, an array of pixel mirrors 104 formed in/on semiconductor substrate 102, a passivation layer 105, a first alignment layer 106, a cover glass 108, a transparent electrode 110, a second alignment layer 112, a gasket 114, and a liquid crystal layer 116. Display 100 is driven at least in part by the image processing and control circuitry (not shown) of device 102. Pixel mirrors 104 are reflective and conductive metal elements formed on device 102 to reflect impinging light 118. Furthermore, mirrors 104 are electrically connected to the circuitry (not shown) of device 102 such that each individual one of mirrors 104 can be selectively charged. Alignment layer 106 is formed over mirrors 104 and facilitates proper alignment of liquid crystal layer 116. Together, semiconductor substrate 102, embedded circuitry, pixel mirrors 104, passivation layer 105, and alignment layer 106 form a reflective display backplane.

Glass 108 is a transparent plate through which incident and reflected, modulated light is transmitted. Transparent electrode 110 is formed directly on glass 108 from, for example, Indium Tin Oxide (ITO) to provide a common electrode. Alignment layer 112 is formed on the bottom surface of glass 108, over transparent electrode 110, to facilitate the alignment of liquid crystal layer 116. Gasket 114 is a liquid-tight seal disposed between alignment layers 106 and 112 to seal liquid crystal layer 116 therebetween.

Incident light 118 is polarized in a first predetermined polarization state and enters through the top surface of glass 108, passes through layers 110, 112, 116, and 106, is reflected off mirrors 104, and then passes again through the layers 106, 116, 112, 110, and 108, before exiting display 100. The polarization of the light is altered by liquid crystal layer 116, depending on the electrical field applied across the liquid crystal layer 116 (i.e. between mirrors 104 and transparent electrode 110). When transparent electrode 110 is held at a particular voltage, the electrical field across liquid crystal layer 116 is controlled by the voltages asserted on the individual mirrors 104. Thus, the polarization of the incident light is spatially modulated according to image signals asserted on mirrors 104, and the light is output as a spatially modulated beam 120. The modulated beam 120 is then analyzed by an analyzer having a predetermined polarization state to produce a displayable image. The intensity of light displayed for each pixel thus depends on the polarization imparted by the liquid crystal, responsive to a particular signal asserted on each mirror 104.

There are some problems associated with prior art display 100. For example, current LCOS image displays have relatively low light efficiencies. There are several factors that can contribute to low light efficiency, including liquid crystal characteristics, transmittance of ITO layer, reflectance characteristics of pixel mirrors, etc.

What is needed, therefore, is a LCOS display having improved light efficiency.

SUMMARY

The present invention overcomes the problems associated with the prior art by providing a reflective display backplane with highly reflective pixel mirrors. Example devices and methods facilitate the formation of a highly reflective layer on a less reflective pixel mirror. For example, reflective display backplanes include additional circuitry that facilitates electroplating a silver layer on top of the aluminum pixel mirrors of the backplane, while maintaining spacing between the pixel mirrors and without interfering with the normal operation of the backplane.

An example liquid crystal display device includes a circuit substrate, an array of pixel electrodes formed on the substrate, an array of pixel mirror formed over the electrodes, a transparent electrode, and liquid crystal material. The pixel electrodes are formed from a first material having a first reflectance, and the conductive pixel mirrors are formed from a second material having a second reflectance that is greater than the first reflectance. Each of the conductive pixel mirrors is formed on a respective one of the pixel electrodes. The transparent electrode is disposed a spaced distance over the array of conductive pixel mirrors, and liquid crystal material is disposed between the conductive pixel mirrors and the transparent electrode.

In an example liquid crystal display device, the first material includes aluminum and the second material includes silver. Optionally, the second material can include a silver alloy. For example, and without limitation, the second material can include a silver-lead-copper alloy. In a particular example display device, each said pixel electrode is an aluminum pixel mirror of a reflective display backplane, and each said conductive pixel mirror is a layer including silver formed on a respective one of said aluminum pixel mirrors.

Example liquid crystal display devices additionally include a liquid crystal alignment layer disposed directly on the array of conductive pixel mirrors. Alternatively, and example liquid crystal display device can additionally include a planarization layer, disposed directly on the array of conductive pixel mirrors, and a liquid crystal alignment layer, disposed directly on the planarization layer.

Example liquid crystal display devices include circuitry to facilitate manufacturing the pixel mirrors. For example, the circuit substrate can include a plurality of diodes, and each electrode can be electrically coupled to a common node of the circuit substrate via a respective one of the diodes.

In a particular example display device, each of the diodes includes an anode and a cathode. The anode of each respective one of the diodes is electrically coupled to the common node, and the cathode of each respective one of the diodes is electrically coupled to an associated one of the pixel electrodes. Optionally, the common node can be coupled to or be the ground plane of the circuit substrate. Each of the diodes has a breakdown voltage that is greater than the voltage required to drive the electrode during operation of the liquid crystal display device, and asserting a voltage that is greater than or equal to the breakdown voltage of the diodes on the cathodes causes current to flow through the diodes in reverse bias. This configuration can facilitate the flow of electroplating process current through the individual pixel electrodes/mirrors, while isolating the pixel electrodes from one another during normal operation of the display device.

In another example liquid crystal display device, the cathode of each of the diodes is electrically coupled to the common node, and each of the pixel electrodes is electrically coupled to an anode of an associated one of the diodes. The circuit substrate includes a contact pad, and the contact pad is electrically coupled to the common node. This configuration can also facilitate the flow of electroplating process current through the individual pixel electrodes/mirrors, while isolating the pixel electrodes from one another during normal operation of the display device.

Example methods of manufacturing liquid crystal display devices are also disclosed. One example method includes providing a circuit substrate including an array of pixel electrodes formed thereon. The pixel electrodes include a first conductive material having a first reflectance. The example method additionally includes providing a second conductive material having a second reflectance that is greater than the first reflectance, providing a transparent electrode, and providing liquid crystal material. The example method additionally includes forming an array of conductive pixel mirrors over the array of electrodes. The conductive pixel mirrors are formed from the second material such that each of the conductive pixel mirrors is formed over a respective one of the electrodes. The liquid crystal display device is then assembled by disposing the transparent electrode over the array of conductive pixel mirrors, and disposing the liquid crystal material between the transparent electrode and the array of conductive pixel mirrors.

In a particular example method, the step of forming an array of conductive pixel mirrors over the array of electrodes includes electroplating the second conductive material on the first conductive material. The first conductive material can be, for example, aluminum, and the second conductive material can be, for example, silver. Optionally, the second conductive material can include a silver alloy. As a more particular example, the silver alloy can include a silver-lead-copper alloy.

Optionally, an example method additionally includes forming a planarization layer over the array of conductive pixel mirrors, and forming a liquid crystal alignment layer over the planarization layer after the planarization layer is formed over the conductive pixel mirrors. Alternatively, the example method can include forming a liquid crystal alignment layer directly on the array of conductive mirrors.

In an example method, the circuit substrate includes a plurality of diodes, and each pixel electrode is electrically coupled to a common node of the circuit substrate via a respective one of the diodes. In a particular example method, each of the diodes includes an anode and a cathode. The anode of each respective one of the diodes is electrically coupled to the common node, and the cathode of each respective one of the diodes is electrically coupled to an associated one of the electrodes. Optionally, the common node can be a ground plane of the circuit substrate.

In a particular example method, each of the diodes has a breakdown voltage that is greater than the voltage required to drive the electrode during operation of the liquid crystal display device. In this particular example method, the step of forming the array of conductive pixel mirrors includes asserting a voltage that is greater than or equal to the breakdown voltage of the diodes on the cathodes such that current (e.g., electroplating process current) flows through the diodes in reverse bias.

In an alternate example method, the cathode of each of the diodes is electrically coupled to the common node, and each of the pixel electrodes is electrically coupled to an anode of an associated one of the diodes. The circuit substrate can include a contact pad, and the contact pad can be electrically coupled to the common node. Electroplating process current can then be provided to the individual pixel electrodes via the contact pad and common node.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by applying highly reflective material over pixel electrodes/mirrors of an LCoS device. In the following description, numerous specific details are set forth (e.g., pixel mirror material, particular display device structures, etc.) in order to provide a thorough understanding of the invention. Those skilled in the art will recognize, however, that the invention may be practiced apart from these specific details. In other instances, details of well-known liquid crystal display manufacturing practices (e.g., pixel array formation, semiconductor fabrication processes, etc.) and components have been omitted, so as not to unnecessarily obscure the present invention.

In the following description, the fabrication of electronic devices is discussed. The devices are fabricated in/on a semiconductor substrate. For example, a particular device might include components formed in the substrate (dopants diffused into the substrate) and other components formed on the substrate (e.g., connecting metal layers). Therefore, if a device is described as being formed on a semiconductor substrate, it should be understood that portions of the device might be formed in the substrate and other portions formed on the substrate. Similarly, if a device is described as being formed in the semiconductor substrate, it should be understood that portions of the device might be formed in the substrate and other portions formed on the substrate.

Figure 1:
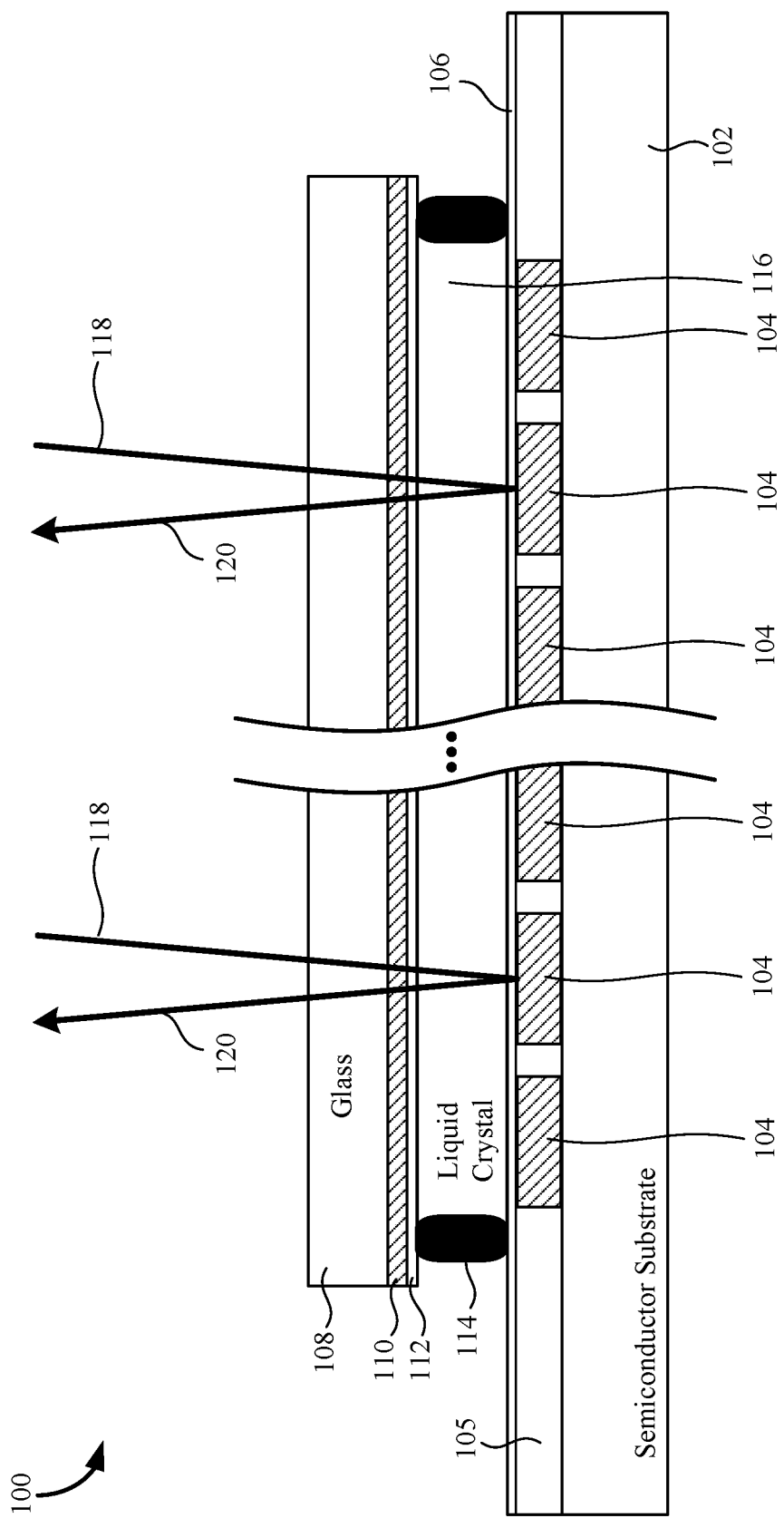
FIG. 1 is cross-sectional view of a prior art LCoS device.
Figure 2:
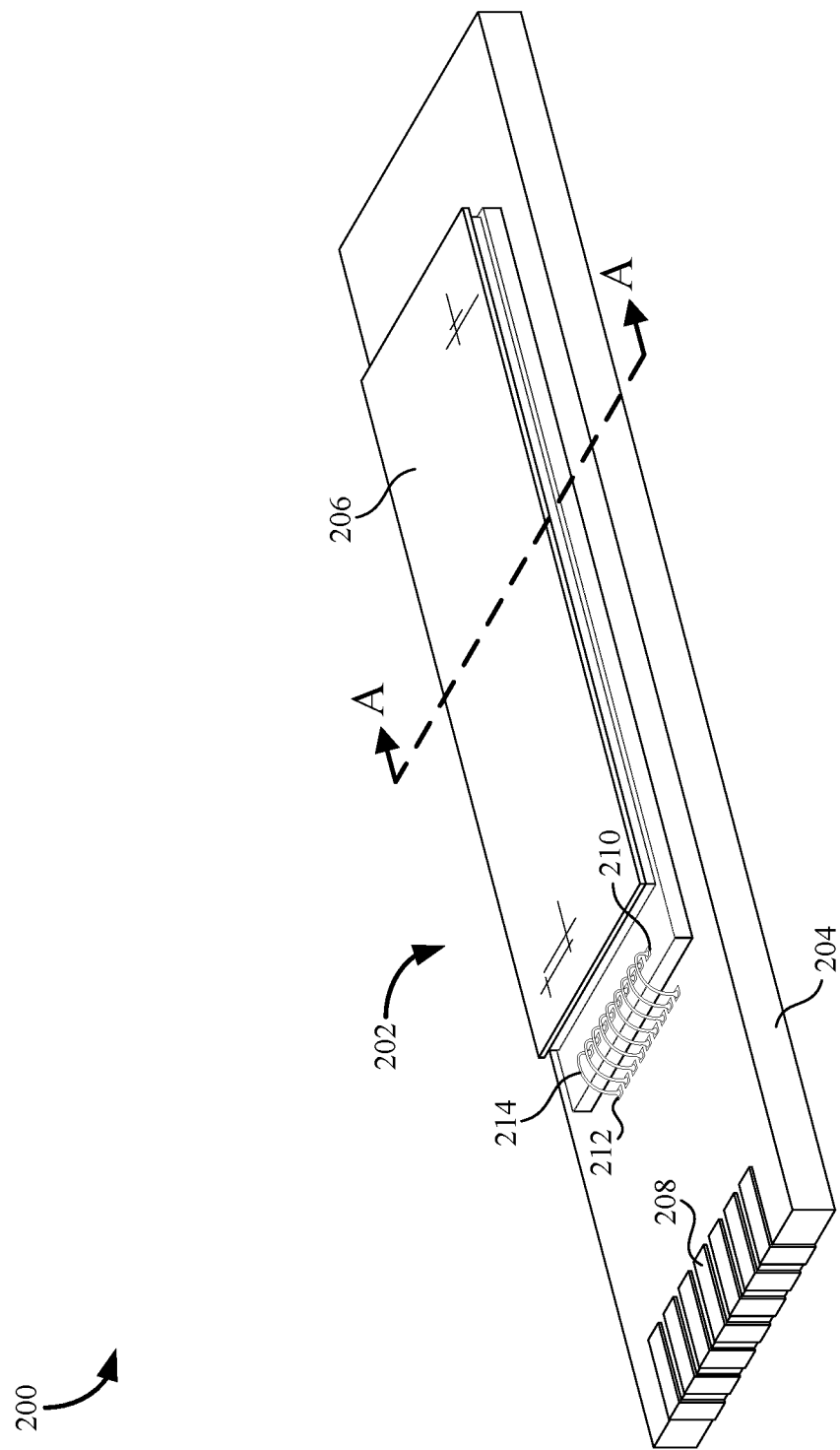
FIG. 2 is a perspective view of an LCoS display assembly including a highly reflective LCoS device.

FIG. 2 shows a perspective view of an improved reflective LCoS display assembly 200. Display assembly 200 includes a display device 202 and a printed circuit substrate (PCB) 204. Display device 202 includes a display surface 206, through which light enters and exits. The incident light is modulated (e.g., polarization rotated) and then exits as a modulated image beam. PCB 204 enables display device 202 to communicate with, and be powered by, a host device (not shown) via I/O terminals (pins) 208. Display device 202 is mounted on, and electrically connected to, PCB 204. As shown, display device 202 includes a set of bond pads 210 that are electrically connected to a complimentary set of bond pads 212 of PCB 204, via a respective set of bonded wires 214.

Figure 3:
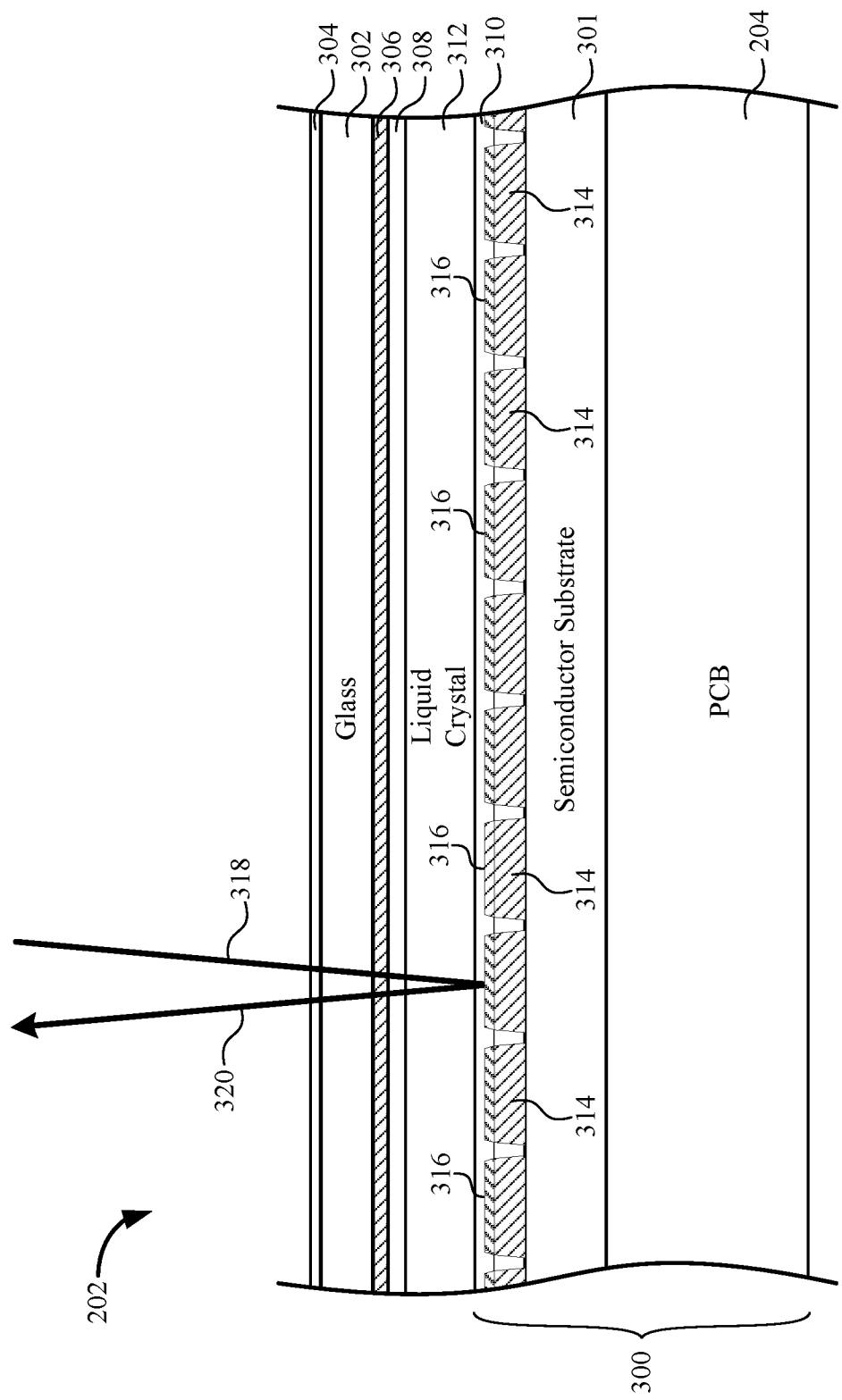
FIG. 3 is a cross-sectional side view, taken along line A-A, of a portion of the LCoS display assembly of FIG. 2.

FIG. 3 is a cross-sectional view of display device 202 and PCB 204 taken along line A-A of FIG. 2. Display device 202 includes a reflective display backplane (RDP) 300, a cover glass 302, an anti-reflective (AR) layer 304, a transparent electrode 306, a first alignment layer 308, a second alignment layer 310, and a liquid crystal layer 312. RDB 300 is formed in/on a semiconductor substrate 300 and can be, for example, a complementary metal-oxide-semiconductor (CMOS) silicon chip having image processing and control circuitry (not shown) for driving display device 202. RDB 300 additionally includes an array of pixel electrodes 314 and an array of pixel mirrors 316 formed in/on a top surface of RDB 300.

During operation, incident light is polarized in a first predetermined polarization state and enters through layer 304 and the top surface of glass 302, passes through layers 306, 308, 312, and 310, is reflected off mirrors 316, and then passes again through the layers 310, 312, 308, 306, 302, and 304, before exiting display device 202. The polarization of the light is altered by liquid crystal layer 312, depending on the electrical field applied across the liquid crystal layer 312. When transparent electrode 306 is held at a particular voltage, the electrical field across liquid crystal layer 312 is controlled by the voltages asserted on mirrors 316. Thus, the polarization of the incident light is spatially modulated according to image signals asserted on mirrors 316, and the light is output as a spatially modulated beam 318. The modulated beam 318 is then analyzed by an analyzer having a predetermined polarization state to produce a displayable image. The intensity of light displayed for each pixel thus depends on the polarization imparted by the liquid crystal, responsive to a particular signal asserted on each mirror 316.

Anti-reflection layer 304 and transparent electrode 306 are formed on opposite surfaces of cover glass 302. Anti-reflection layer 304 can be, for example, an engineered optical thin film coating. Transparent electrode 306 is, for example, a layer of conductive material (e.g. ITO) that is thin enough to be transparent and functions as a common electrode across liquid crystal layer 312.

Alignment layers 308 and 310 facilitate the alignment of the liquid crystal molecules of liquid crystal layer 312. Alignment layer 308 is formed on the bottom surface of transparent electrode 306, and alignment layer 310 is formed over pixel mirrors 316. Alignment layers 308 and 310 can be formed from any suitable material such as, for example, polyimide and/or SiOx.

Electrodes 314 are conductive elements formed over the circuitry of RDB 300. Electrodes 314 are formed from an aluminum layer that is deposited directly on RDB 300 and then etched leaving behind an array of discrete electrodes. The etching forms physical gaps between each individual one of electrodes 314, thereby electrically isolating them from one another. Each of electrodes 314 is coupled to underlying circuitry by an associated metal via formed through the layer upon which electrodes 314 are formed. During operation, each of electrodes 314 is driven individually. The electrical field between an electrode 314 and transparent electrode 306 controls the orientation of the liquid crystal material disposed therebetween and, therefore, the rotation of the polarization of light passing therethrough.

In prior art devices, the aluminum electrodes themselves functioned as pixel mirrors. However, aluminum has limited reflectance in the visible light range, and the reflectance of aluminum is further reduced by semiconductor fabrication processes used to complete the manufacture of RDB 300.

To overcome the limited reflectance of the aluminum electrodes, each of mirrors 316 is formed over a respective one of electrodes 314 to significantly increase the reflectance thereof. Because mirrors 316 are much more reflective than prior art aluminum pixel mirrors, display device 202 has significantly higher light source efficiency. Mirrors 316 are formed from a conductive material having a higher light reflectance than the aluminum from which electrodes 314 are formed. In this example, mirrors 316 are formed by depositing a silver layer directly over electrodes 314. Within the light wavelength range of 300 nanometers to 1000 nanometers, silver has a reflectance of 98% reflectance as compared to the 92% reflectance of aluminum. Other materials having a higher reflectance than aluminum may also be used to form mirrors 316. For example, mirrors 316 can be formed from silver alloys including, but not limited to, AgPbCu. In this example, mirrors 316 are formed only on the top surface of each of electrodes 314. SiOx is formed in the electrode gaps before mirrors 316 are formed and, therefore, maintains the gaps between electrodes 314.

Depositing mirrors 316 on the very small electrodes 314 can be problematic. Mirrors 316 must be uniform, and the gaps between mirrors 316 must be maintained. The inventor has determined that electroplating is an effective way to form mirrors 316 on electrodes 314. In the following description, various means (e.g., device configuration, processing, etc.) for facilitating the electroplating process are disclosed, by way of non-limiting example.

Figure 4A:
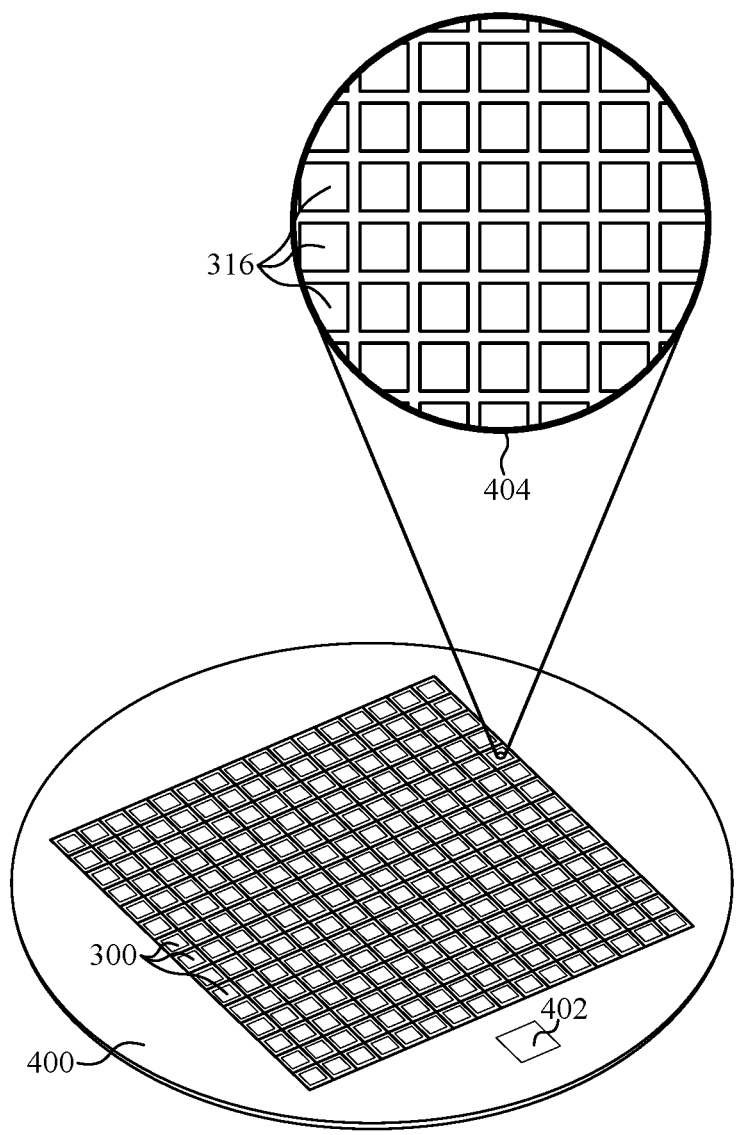
FIG. 4A a perspective view of an un-diced silicon wafer in/on which the reflective display backplane of the LCoS device of FIG. 2 is fabricated.

FIG. 4A shows a perspective view of a silicon wafer 400 having an array of RDBs 300 and an optional probe contact pad 402 formed thereon. Although only a square array of RDBs are shown, it should be understood that as many RDBs as possible would be formed to make full use of the wafer 400. Wafer 400 will eventually be diced into a plurality of discrete RDBs 300, each of which will be used to form an individual display device 202. As shown by the close-up window 404, mirrors 316 are formed on electrodes 314 of wafer 400 before wafer 400 is diced into individual devices 300. Alternatively, mirrors 316 could be formed on devices 300 after wafer 400 is diced.

Figure 4B:
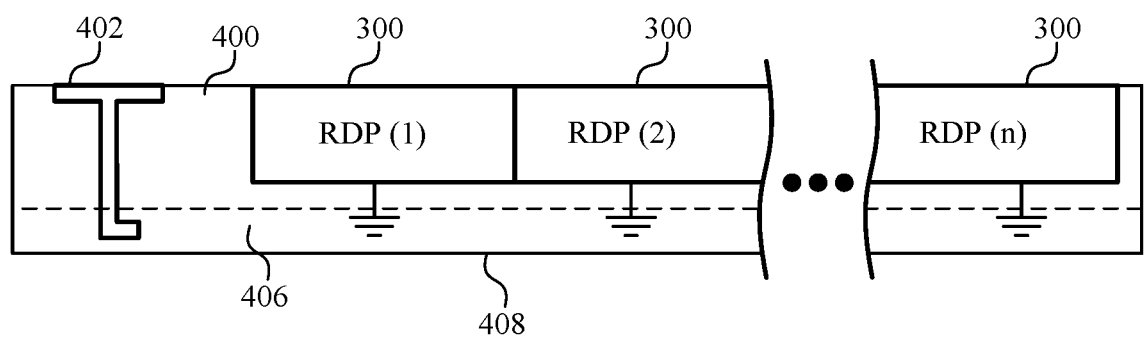
FIG. 4B a cross-sectional side view of the wafer of FIG. 4A.

FIG. 4B shows a cross-sectional, side view of wafer 400 taken along line A-A of FIG. 4A. As shown, contact pad 402 and each of RDPs 300 are all connected to the same ground plane 406 of wafer 400. Therefore, contact pad 402 and ground plane 406 form a common (the same) electrical node. This allows a particular voltage or ground to be asserted on the ground plane 406 of every RDB 300 by connecting a voltage source or ground electrode to contact pad 402. A particular voltage or ground can also be asserted on ground plane 406 simply by electrically coupling a voltage source or ground source to the bottom surface 408 of wafer 400.

Figure 4C:
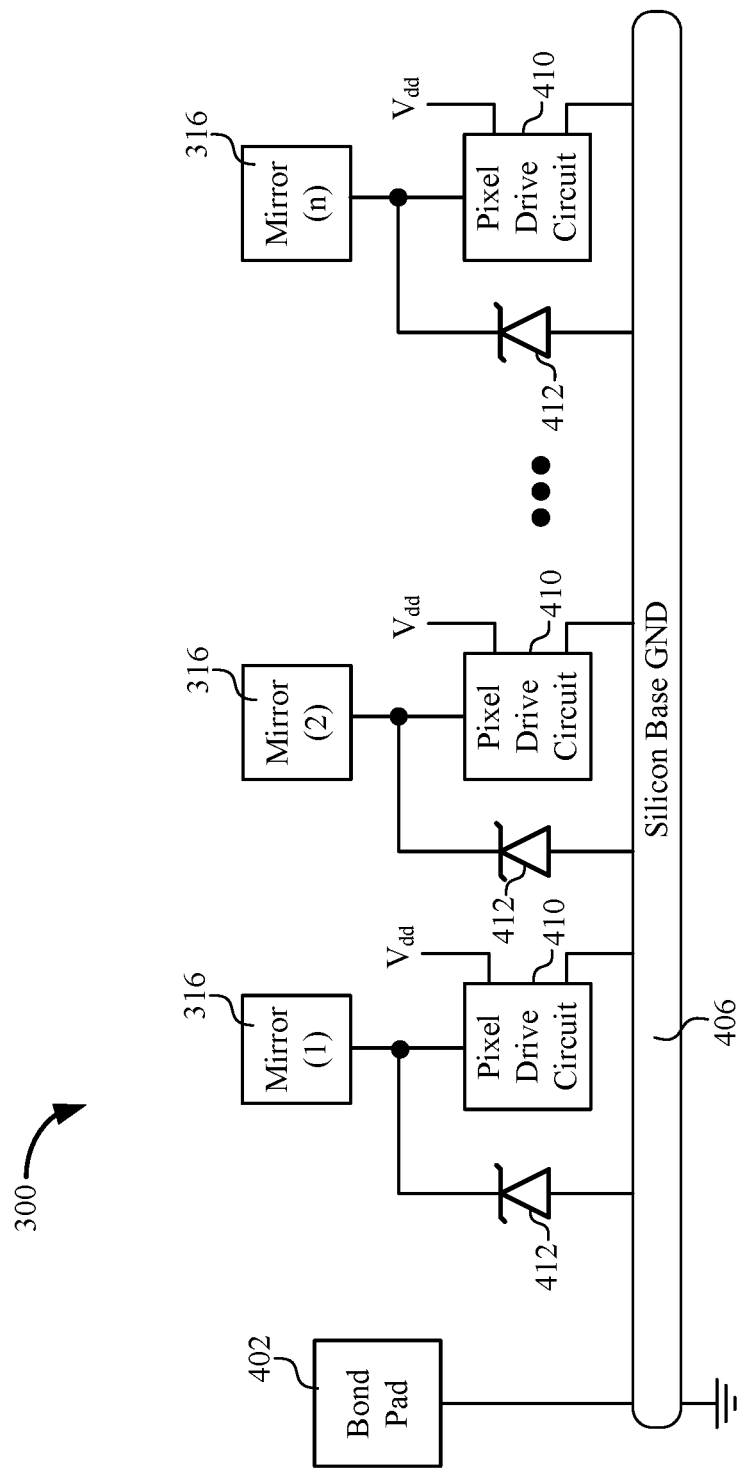
FIG. 4C is diagram depicting some of the circuitry of the wafer of FIG. 4A.

FIG. 4C is a diagram depicting some of the circuitry of wafer 400, by way of example. In this example, bond pad 402 is electrically connected directly to ground plane 406 to provide an electrical connection, through which the voltage of ground plane 406 can be controlled by outside voltage and/or ground electrodes. For example, ground plane 406 can be set to ground by contacting a ground electrode/probe to bond pad 402.

Each of mirrors 316(1-n) is electrically coupled to ground plane 406 through a respective pixel drive circuit 410 and a respective Zener diode 412. During normal operation, each pixel drive circuit 410 asserts high and low voltages the associated mirror 316 to which it is connected, responsive to image data received by the drive circuit 410. For example, when a high voltage is to be asserted on mirror 316, pixel drive circuit 410 connects mirror 316 to a high voltage line Vdd. When a low voltage is to be asserted on mirror 316, pixel drive circuit 410 connects mirror 316 to ground plane 406. However, during the electroplating process, pixel drive circuits 410 are not energized and do not, therefore, control the voltages asserted on pixel mirrors 316.

In order to assert an electroplating voltage and/or supply an electroplating current to pixel mirrors 316, each diode 412 is connected between a respective one of pixel mirrors 316 and ground plane 406 in reverse bias. As shown, the anode of each respective diode 412 is connected to ground plane 406 while the cathode is connected to a respective one of pixel mirrors 316. This allows electrical current to flow through pixel mirrors 316, through diodes 412 (in reverse bias), through ground plane 406, through bond pad 402, and ultimately to a negative terminal of the electroplating process. However, diodes 412 prevent the pixel mirrors 316 from shorting to ground plane 406 during normal operation of RDB 300, because the breakdown voltage of diodes 412 exceeds the highest voltage ($V_{dd}$) asserted by pixel drive circuits 410. Thus, all mirrors 316(1-n) can be electrically coupled to a common node for electroplating purposes, but remain isolated from one another during normal operation.

The fabrication of display device 202 will now be described with reference to FIGS. 5A 5D.

Figure 5A:
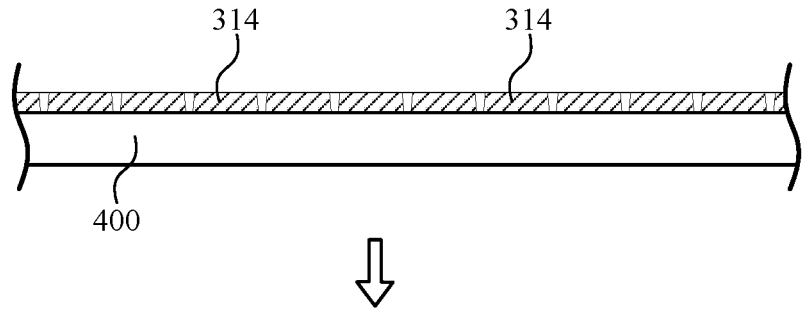
FIG. 5A summarizes a first step in manufacturing the wafer of FIG. 4A.

First, as depicted in FIG. 5A, a wafer 400 is provided. At this point, wafer 400 includes contact pad 402, all the integrated circuitry of the array of RDBs 300, and all of electrodes 314 (e.g., aluminum pixel mirrors) formed thereon, but does not yet include mirrors 316 (e.g., silver layers on aluminum pixel mirrors).

Figure 5B:
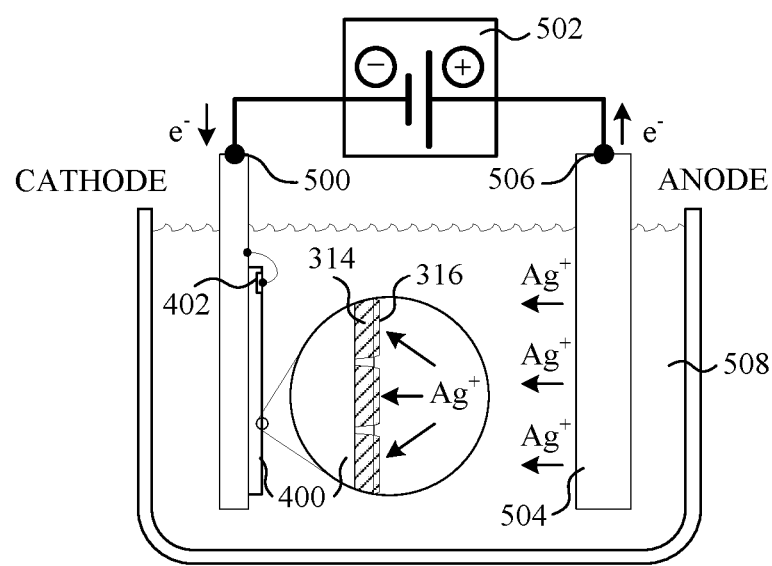
FIG. 5B summarizes a second step in manufacturing the wafer of FIG. 4A.

Then, as depicted in FIG. 5B, mirrors 316 are formed over electrodes 314 by electroplating. This includes electrically connecting ground plane 406 (FIG. 4) to the negative terminal 500 of a direct current voltage source 502. Electrically connecting ground plane 406 to terminal 500 can be achieved by electrically connecting contact pad 402 of wafer 400 to voltage source 502 by for example, an electrical probe, a wirebond, or any suitable, temporary connection. Optionally, electrically connecting ground plane 406 to terminal 500 can be achieved by making contact between terminal 500 and bottom surface 408 of wafer 400. In either case, terminal 500 is electrically connected to every electrode 314 of wafer 400, simultaneously, such that all of electrodes 314 become the cathode in the electroplating process. Next, a piece of donor silver 504 is electrically connected to the positive terminal 506 of voltage source 502 such that silver 504 becomes an anode. Both wafer 400 and silver 504 are then submerged in an electrolyte solution 508 containing one or more dissolved metal salts as well as other ions that facilitate the flow of electricity. A voltage is then asserted across terminals 500 and 506. This voltage is greater than the breakdown voltage of diodes 412, so current flows into electrodes 314, then through diodes 412, and out through ground plane 406. Voltage source 502 supplies a direct current to silver 504, thereby oxidizing the metal atoms and allowing them to dissolve in solution 508. At electrodes 314 (cathode), the dissolved metal ions ($Ag^+$) in solution 508 ($AgNO_{(aq)}$) are reduced at the interface between solution 508 and electrodes 314 such that electrodes 314 "plate out". The rate at which silver 504 dissolves is equal to the rate at which electrodes 314 are plated. Indeed, the ions in the electrolyte solution are continuously replenished by silver 504. Once a sufficient thickness of mirrors 316 is achieved, wafer 400 is disconnected from terminal 500 and removed from solution 508.

Figure 5C:
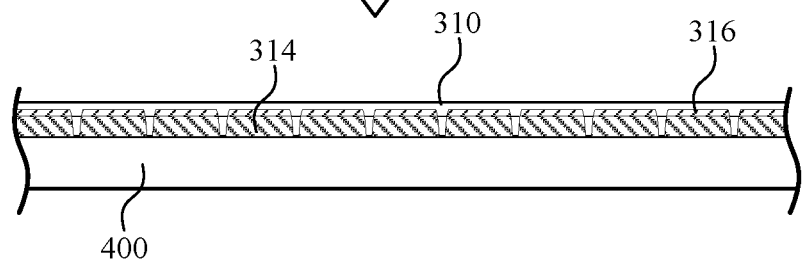
FIG. 5C summarizes a third step in manufacturing the wafer of FIG. 4A.

Next, as depicted in FIG. 5C, liquid crystal alignment layer 310 is formed on the top surface of wafer 400, directly over mirrors 316. Alignment layer 310 can be formed from any suitable material including, but not limited to, polyimide and/or SiOx.

Figure 5D:
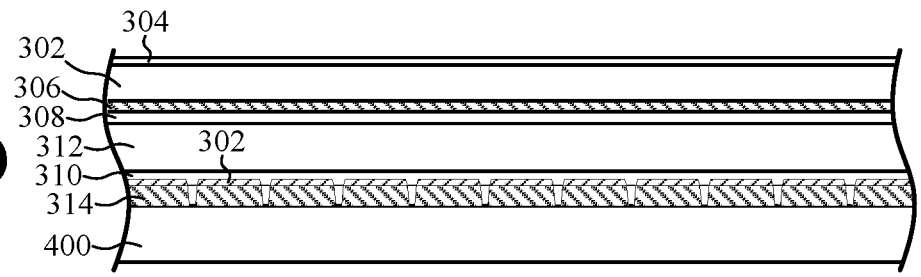
FIG. 5D summarizes a fourth step in manufacturing the wafer of FIG. 4A.

Finally, as depicted in FIG. 5D, each of RDBs 300 are coupled to a respective glass 302 with liquid crystal layer 312 is disposed therebetween. Glass 302 includes anti-reflection layer 304 and transparent electrode 306, which are formed on opposite surfaces thereof before being coupled to RDB 300.

Singulation of RDBs 300 from wafer 400 typically occurs between the steps shown in FIGS. 5C and 5D. However, it is conceivable that electroplating could be accomplished after singulation. When singulation of wafer 400 occurs before the electroplating process, each of RDBs 300 is individually electrically coupled to terminal 500 by, for example, establishing contact between terminal 500 and a bottom surface of the RDB 300 during the electroplating process.

Figure 6A:
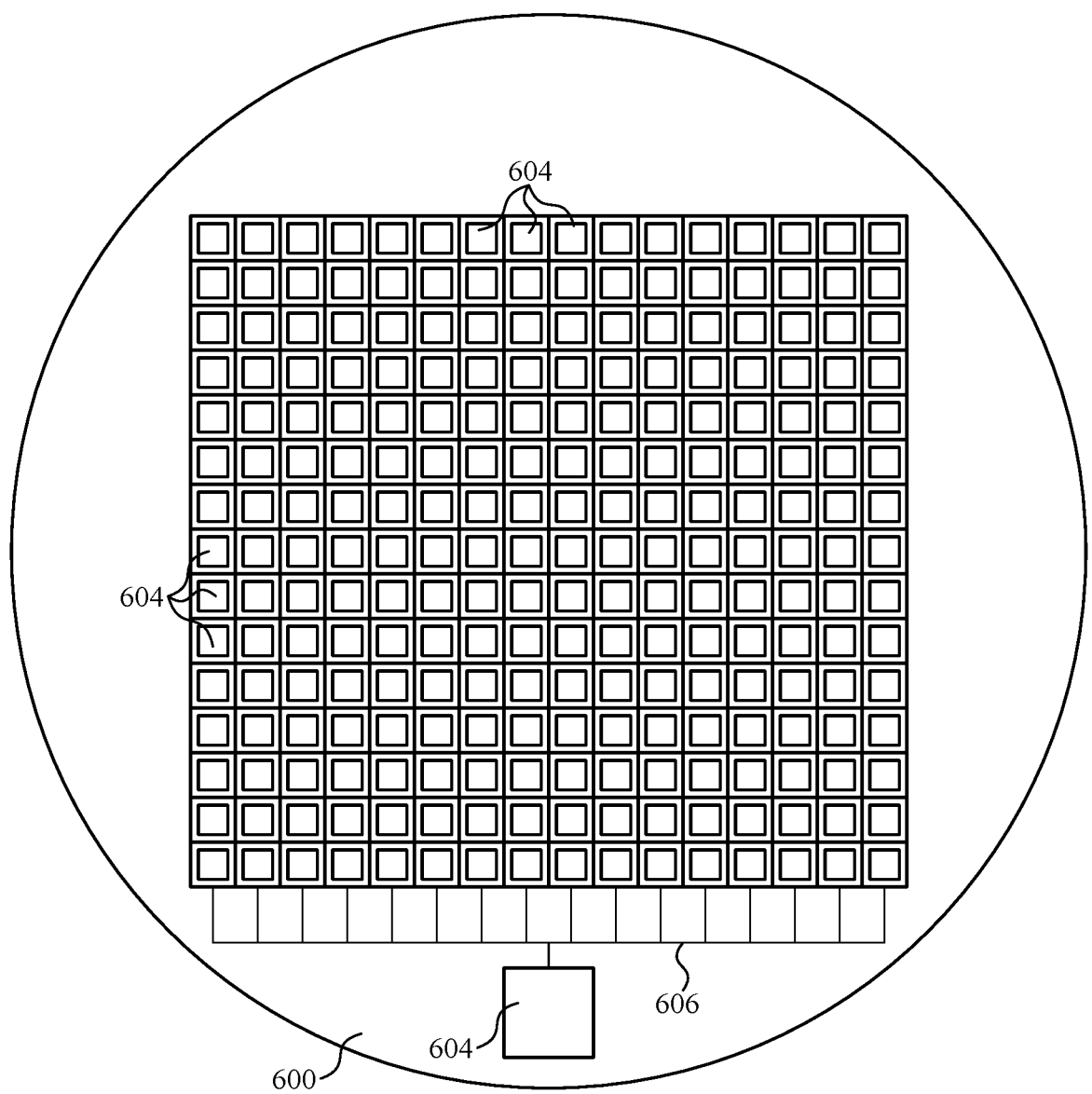
FIG. 6A shows an alternate wafer from which the LCoS device of FIG. 2 can be formed.

FIG. 6A shows an alternate wafer 600 including a plurality of RDBs formed thereon. Wafer 600 is substantially similar to wafer 400, except that wafer 600 has alternate circuitry for establishing an electrical connection with all the pixel electrodes of wafer 600 during the electroplating process.

Wafer 600 includes an array of RDBs 602 electrically connected to a contact pad 604 formed thereon via a plurality of conductive circuit lines 606. Circuit lines 606 provide a conductive pathway between contact pad 604 each of RDBs 602. Indeed, circuit lines 606 and contact pad 604 form a common electrical node. As shown, circuit lines 606 branch into a plurality of parallel columns that provide an electrical path to respective columns of RDBs 602.

Figure 6B:
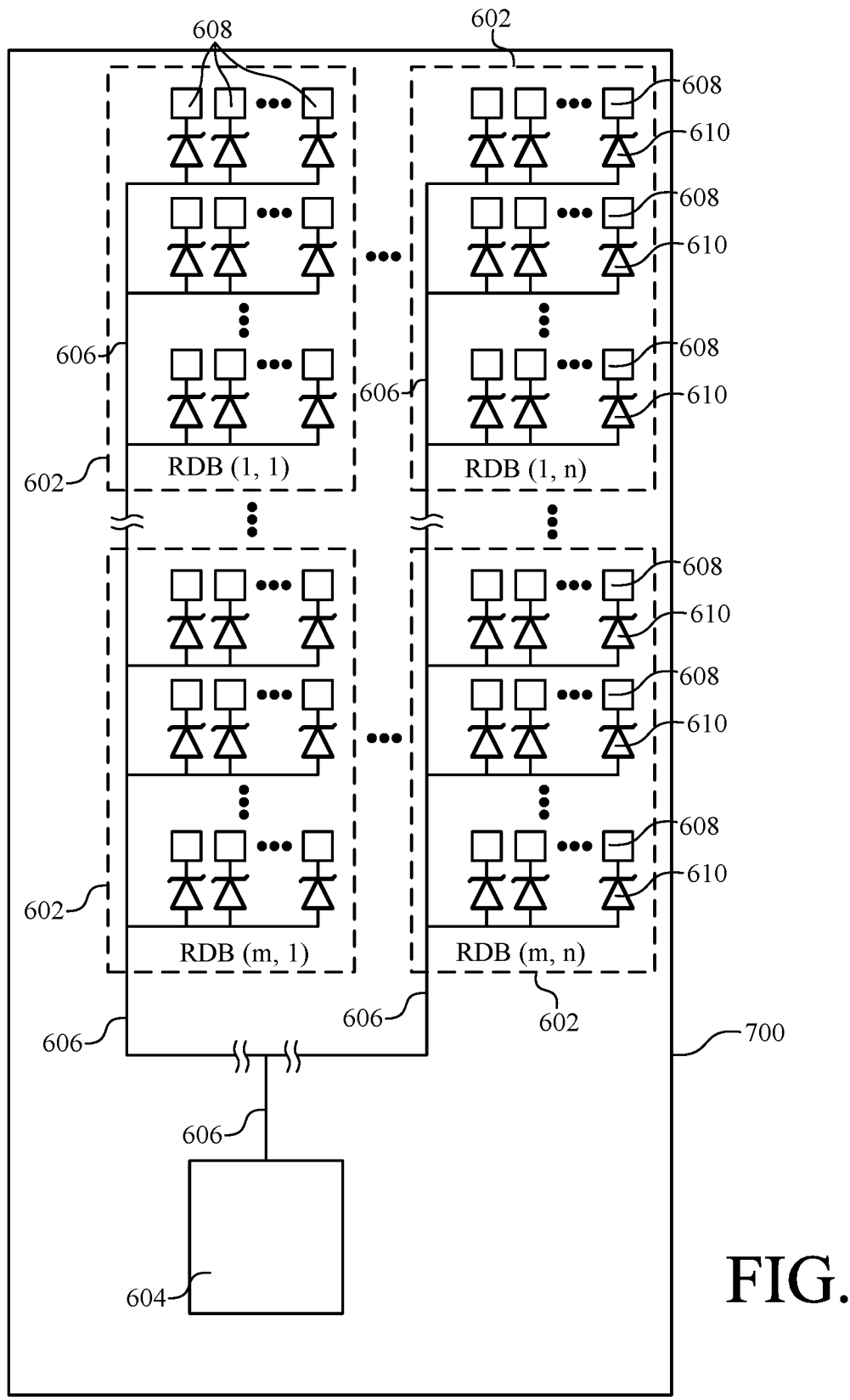
FIG. 6B is a diagram showing circuitry of the wafer of FIG. 6A.

FIG. 6B is a circuit diagram showing the electrical connection between RDBs 602 of wafer 600 and contact pad 604. Each individual pixel mirror 608 is electrically connected to circuit lines 606 through a respective Zener diode 610. More specifically, the anode and cathode of each diode 610 is connected to circuit lines 606 and mirrors 608, respectively. This allows current to flow from mirrors 608 to contact pad 604 during electroplating but prevents current from flowing through diodes 610 when mirrors 608 are electrically driven during normal operation of RDBs 602. During the electroplating process, the voltage drop across diodes 610 is at least as great as the breakdown voltage of diodes 610, so that current flows therethrough. During the driving of mirrors 608 in normal operation, the high voltages asserted thereon by the pixel drive circuits (not shown) are less than the breakdown voltage of diodes 610, thereby preventing mirrors 608 from shorting each other. In other words, the high pixel drive voltage is not high enough to cause current to flow through diodes 610 in reverse bias.

Figure 6C:
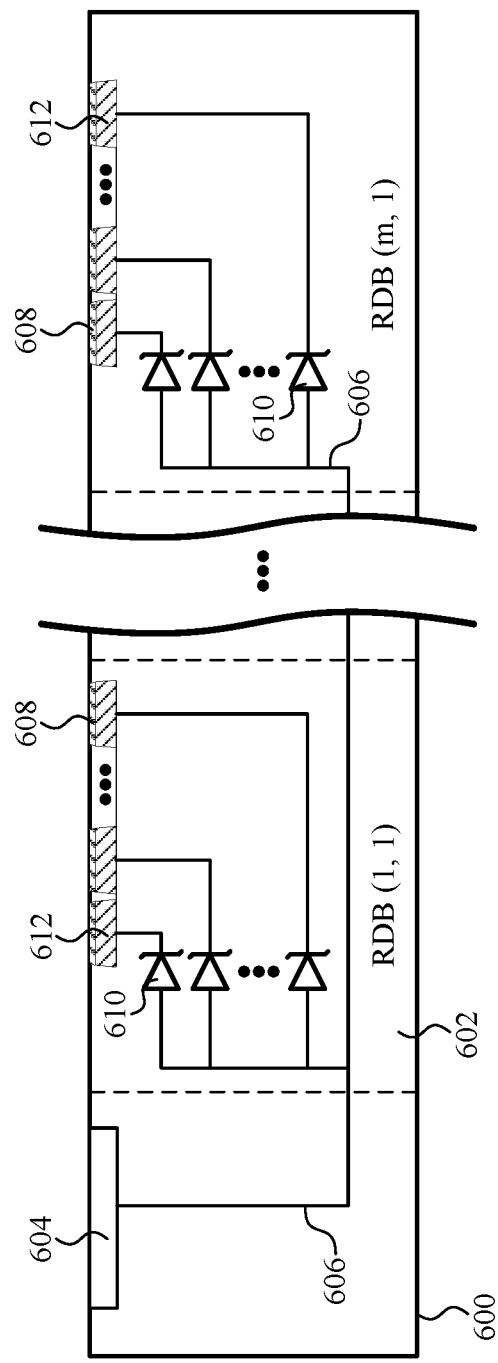
FIG. 6C is another diagram showing circuitry of the wafer of FIG. 6A.

FIG. 6C is a representational, sectioned side view of wafer 600 showing the circuitry thereof. As shown, each of mirrors 608 of RDBs 602 is formed over a respective pixel electrode 612. Electrodes 612 are formed from aluminum during the fabrication of wafer 600 and mirrors 608 are formed by electroplating silver directly on electrodes 612. Mirrors 608 can optionally be formed by electroplating other highly reflective materials onto electrodes 612 including, but not limited to, a Ag—Pb—Cu alloy or other silver alloy.

Figure 7A:
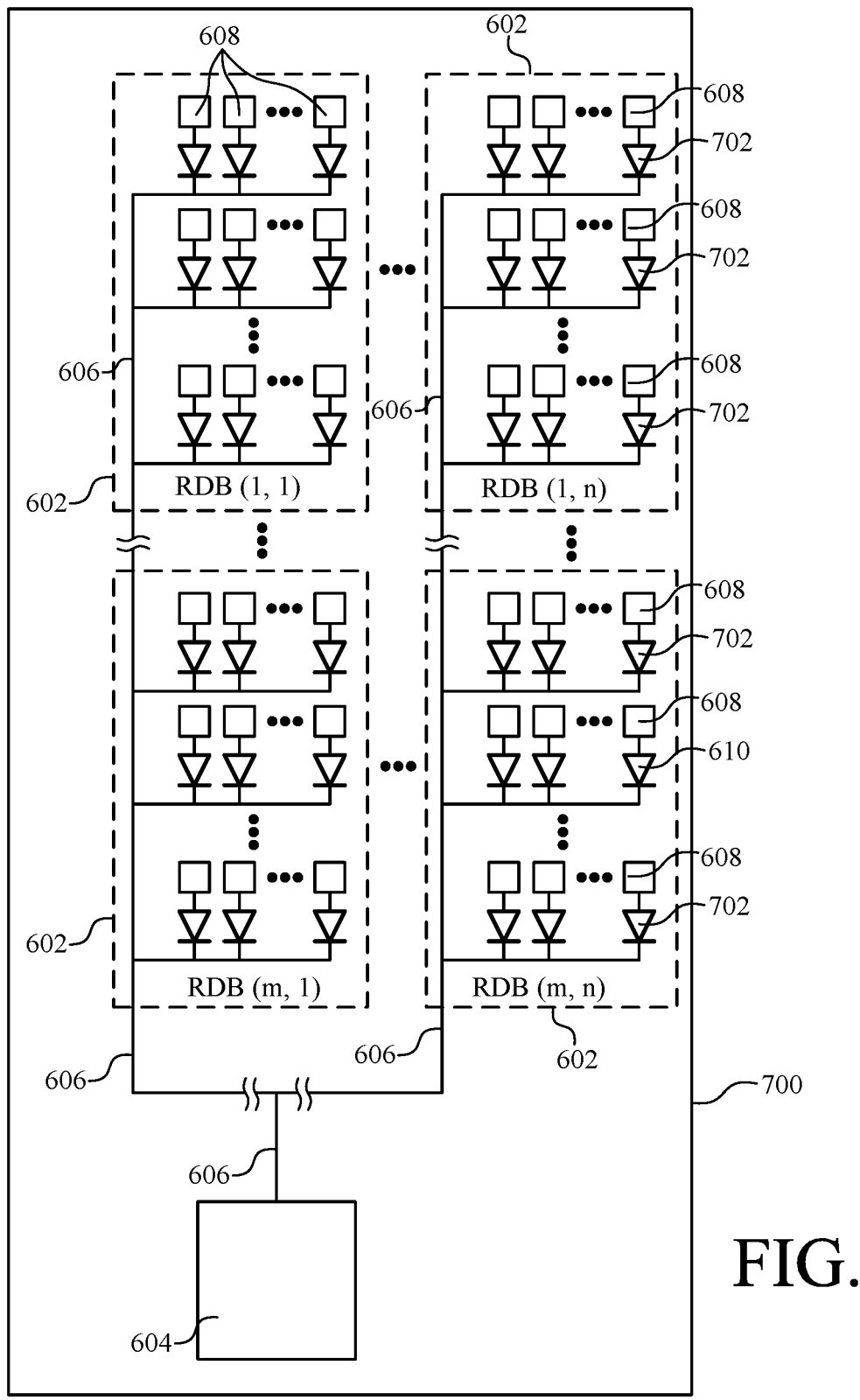
FIG. 7A is a diagram showing alternate circuitry for the wafer of FIG. 6A.

FIG. 7A is a circuit diagram of wafer 700 according to another alternate example embodiment. The circuitry of wafer 700 is substantially identical to wafer 600, except that diodes 702 are substituted for diodes 610. As shown, diodes 702 are configured such that the anodes are connected to respective mirrors 608, and the cathodes are connected to lines 606. During the electroplating process, a negative electrode is connected to contact pad 604, and current flows from mirrors 608, through diodes 702, through contact pad 604, and then into the negative terminal of the power supply. During normal pixel driving operations, the high voltage asserted on a pixel does not get asserted on neighboring pixels because diodes 702 prevent backflow of current. Thus, mirrors 608 are electrically isolated from one another during driving operations, but not during electroplating. Of course, during driving operations, devices 704 are singulated from wafer 600 and, therefore, disconnected from contact pad 604.

Figure 7B:
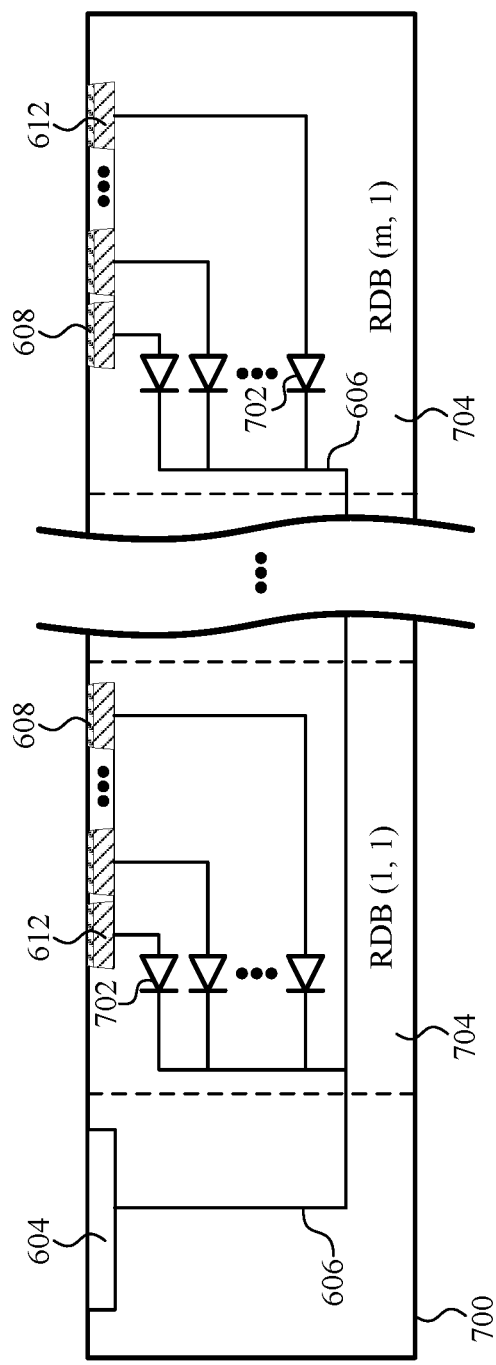
FIG. 7B is another diagram showing the circuitry of the embodiment of FIG. 7A.

FIG. 7B is a representational, sectioned side view of wafer 700 showing the circuitry thereof. As shown, each of mirrors 608 of devices 704 is formed over a respective electrode 612. Electrodes 612 are formed from aluminum during the fabrication of wafer 700, and mirrors 608 are formed by electroplating silver directly on electrodes 612. Mirrors 608 can optionally be formed by electroplating any other known highly reflective material(s) onto electrodes 612 including, but not limited to, Ag—Pb—Cu or some other alloy.

Figure 8:
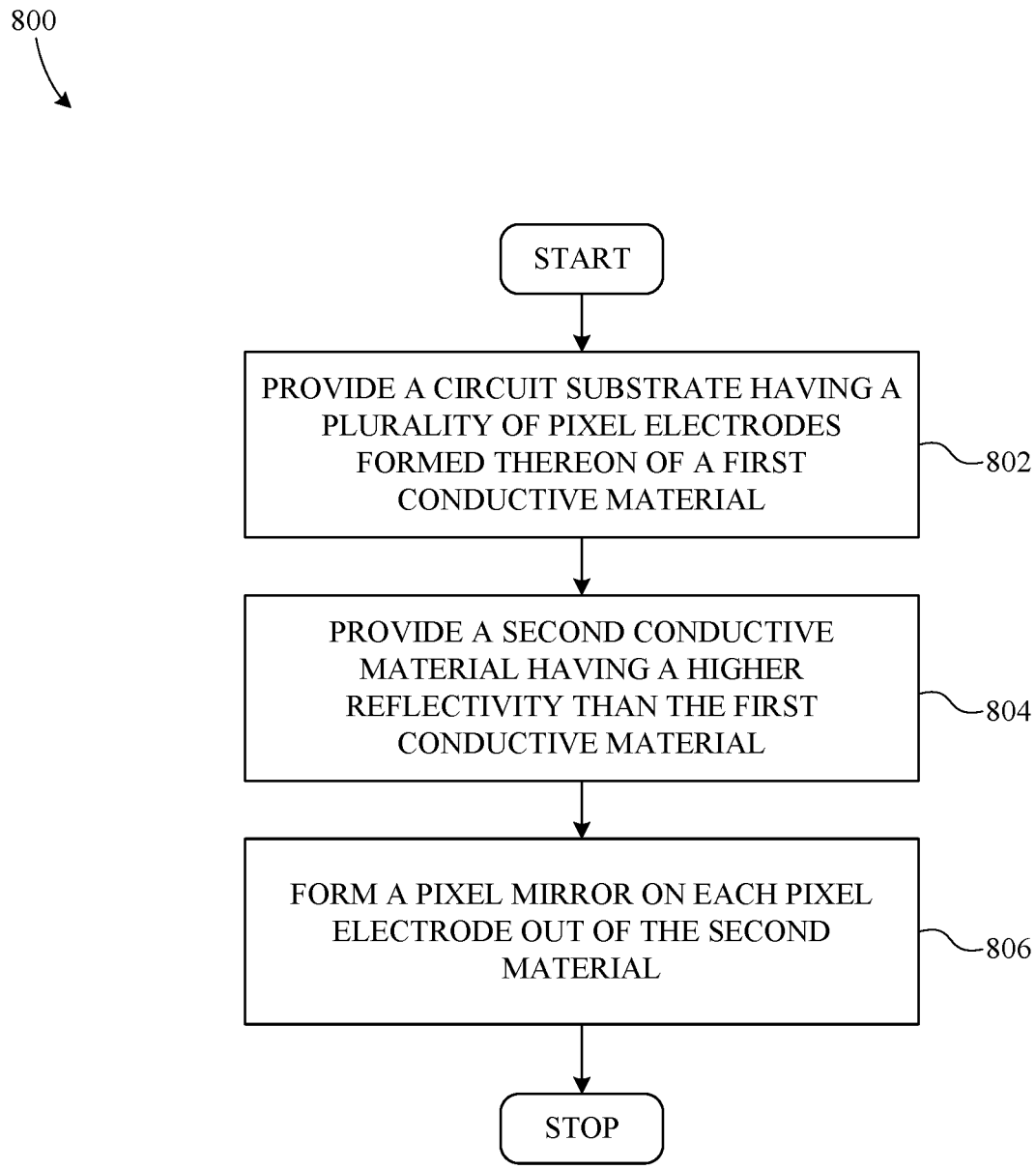
FIG. 8 is a flowchart summarizing an example method of manufacturing a liquid crystal device.

FIG. 8 is a flowchart summarizing a method 800 of manufacturing a reflective LCoS display backplane. In a first step 802, a circuit substrate having a plurality of pixel electrodes formed from a first conductive material is provided. Then, in a second step 804, a second conductive material having a higher reflectance than the first conductive material is provided. Finally, in a third step 806, a pixel mirror is formed on each respective pixel electrode with the second conductive material.

Figure 9:
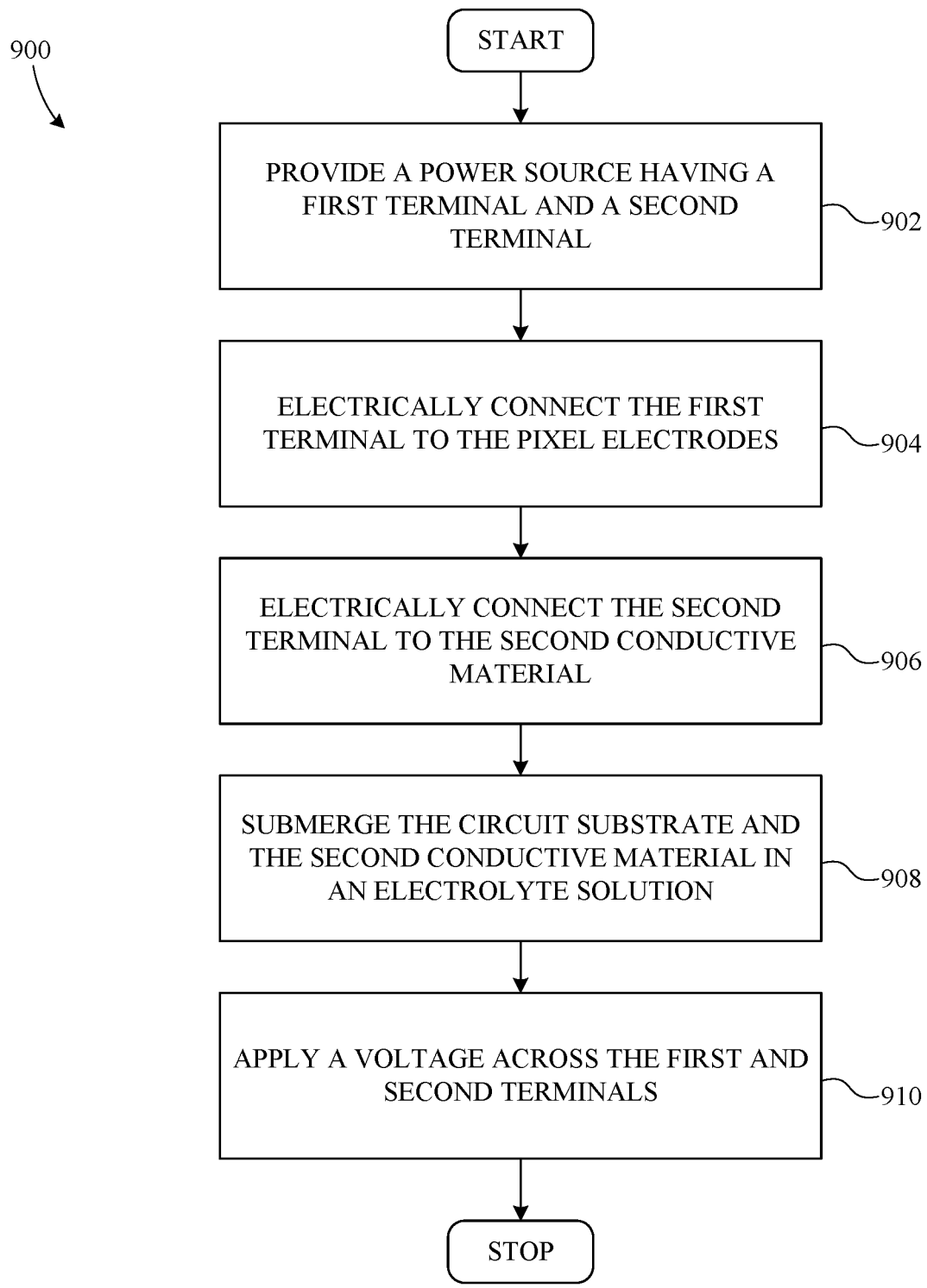
FIG. 9 is a flowchart summarizing an example method of performing the step of forming pixel mirrors in the method of FIG. 8.

FIG. 9 is a flowchart 900 summarizing one example method for performing third step 806 of method 800. In a first step 902, a power source having a first terminal and a second terminal is provided. Then, in a second step 904, the first terminal is electrically connected to the pixel electrodes. Next, in a third step 906, the second terminal is electrically connected to the second conductive material. Then, in a fourth step 908, the circuit substrate and the second conductive material are submerged in an electrolyte solution. Finally, in a fifth step 910, a voltage is asserted on the second terminal.

The description of particular embodiments of the present invention is now complete. Many of the described features may be substituted, altered or omitted without departing from the scope of the invention. For example, alternate highly reflective, conductive materials (e.g., Ag—Pd—Cu Alloy, Gold, Copper, etc.), can be substituted for the silver used to plate the pixel electrodes. As another example, alternate methods of forming the pixel mirrors (e.g., photo-masking and metal deposition, etc.) can be substituted for the electroplating process. As yet another example, the drive circuitry of each pixel can be configured so that the pixel mirrors are electrically coupled to a common node (e.g., the ground plane, a contact pad, etc.) by the drive circuitry when the pixel drive circuitry is in an unpowered state (e.g., when the RDB is still integrated in the wafer, prior to being coupled to an operational power source, etc.). As yet another example, the pixel mirrors can be coupled for the electroplating process via fused links, which can be disrupted after the electroplating process is complete. These and other deviations from the particular embodiments shown will be apparent to those skilled in the art, particularly in view of the foregoing disclosure.

I claim:

1. A liquid crystal display device comprising:
   a circuit substrate;
   an array of pixel electrodes formed on said substrate, said pixel electrodes being formed from a first material having a first reflectance;
   an array of conductive pixel mirrors formed from a second material having a second reflectance that is greater than said first reflectance, each of said conductive pixel mirrors being formed on a respective one of said pixel electrodes;
   a transparent electrode disposed over said array of conductive pixel mirrors; and
   liquid crystal material disposed between said conductive pixel mirrors and said transparent electrode; and wherein
   said circuit substrate includes a plurality of diodes; and
   each electrode is electrically coupled to a common node of said circuit substrate via a respective one of said diodes.

2. The liquid crystal display device of claim 1, wherein:
   each said pixel electrode is an aluminum pixel mirror of a reflective display backplane; and
   each said conductive pixel mirror is a layer including silver formed on a respective one of said aluminum pixel mirrors.

3. The liquid crystal display device of claim 1, wherein said first material includes aluminum.

4. The liquid crystal display device of claim 3, wherein said second material includes silver.

5. The liquid crystal display device of claim 3, wherein said second material includes a silver alloy.

6. The liquid crystal display device of claim 5, wherein said second material includes a silver-lead-copper alloy.

7. The liquid crystal display device of claim 1, wherein said second material includes silver.

8. The liquid crystal display device of claim 1, wherein said second material includes silver alloy.

9. The liquid crystal display device of claim 8, wherein said second material includes silver-lead-copper alloy.

10. The liquid crystal display device of claim 1, further comprising a liquid crystal alignment layer disposed directly on said array of conductive pixel mirrors.

11. The liquid crystal display device of claim 1, further comprising
a planarization layer disposed directly on said array of conductive pixel mirrors; and
a liquid crystal alignment layer disposed directly on said planarization layer.

12. The liquid crystal display device of claim 1, wherein:
each of said diodes includes an anode and a cathode;
said anode of each respective one of said diodes is electrically coupled to said common node; and
said cathode of each respective one of said diodes is electrically coupled to an associated one of said electrodes.

13. The liquid crystal display device of claim 12, wherein said common node is a ground plane of said circuit substrate.

14. The liquid crystal display device of claim 12, wherein:
each of said diodes has a breakdown voltage that is greater than the voltage required to drive said electrode during operation of said liquid crystal display device; and
asserting a voltage that is greater than or equal to said breakdown voltage of said diodes on said cathodes causes current to flow through said diodes in reverse bias.

15. The liquid crystal display device of claim 1, wherein:
each of said diodes includes an anode and a cathode;
said cathode of each of said diodes is electrically coupled to said common node; and
each of said electrodes is electrically coupled to an anode of an associated one of said diodes.

16. The liquid crystal display device of claim 15, wherein said circuit substrate includes a contact pad; and
said contact pad is electrically coupled to said common node.

17. A method of manufacturing a liquid crystal display device, said method comprising:
providing a circuit substrate including an array of pixel electrodes formed thereon, said pixel electrodes including a first conductive material having a first reflectance;
providing a second conductive material having a second reflectance that is greater than said first reflectance;
providing a transparent electrode;
providing liquid crystal material;
forming an array of conductive pixel mirrors over said array of electrodes from said second material such that each of said conductive pixel mirrors is formed over a respective one of said electrodes;
disposing said transparent electrode over said array of conductive pixel mirrors; and
disposing said liquid crystal material between said transparent electrode and said array of conductive pixel mirrors; and wherein
said circuit substrate includes a plurality of diodes; and
each electrode is electrically coupled to a common node of said circuit substrate via a respective one of said diodes.

18. The method of claim 17, wherein said step of forming an array of conductive pixel mirrors over said array of electrodes includes electroplating said second conductive material on said first conductive material.

19. The method of claim 17, wherein said second conductive material includes silver.

20. The method of claim 17, wherein said second conductive material includes a silver alloy.

21. The method of claim 20, wherein said silver alloy includes a silver-lead-copper alloy.

22. The method of claim 17, further comprising:
forming a planarization layer over said array of conductive pixel mirrors; and
forming a liquid crystal alignment layer over said planarization layer after said planarization layer is formed over said conductive pixel mirrors.

23. The method of claim 17, further comprising forming a liquid crystal alignment layer directly on said array of conductive mirrors.

24. The method of claim 17, wherein:
said first conductive material includes aluminum; and
said second conductive material includes silver.

25. The method of claim 17, wherein:
each of said diodes includes an anode and a cathode;
said anode of each respective one of said diodes is electrically coupled to said common node; and
said cathode of each respective one of said diodes is electrically coupled to an associated one of said electrodes.

26. The method of claim 25, wherein said common node is a ground plane of said circuit substrate.

27. The method of claim 25, wherein:
each of said diodes has a breakdown voltage that is greater than the voltage required to drive said electrode during operation of said liquid crystal display device, and
said step of forming said array of conductive pixel mirrors includes asserting a voltage that is greater than or equal to said breakdown voltage of said diodes on said cathodes such that current flows through said diodes in reverse bias.

28. The method of claim 17, wherein:
each of said diodes includes an anode and a cathode;
said cathode of each of said diodes is electrically coupled to said common node; and
each of said electrodes is electrically coupled to an anode of an associated one of said diodes.

29. The method of claim 28, wherein
said circuit substrate includes a contact pad; and
said contact pad is electrically coupled to said common node.

* * * * *